(12) United States Patent
Ratanatharathorn et al.

(10) Patent No.: US 12,113,697 B2
(45) Date of Patent: Oct. 8, 2024

(54) SYSTEM AND METHOD FOR DETERMINING FLOW SPECIFICATION EFFICACY

(71) Applicant: Arbor Networks, Inc., Westford, MA (US)

(72) Inventors: Michael Ratanatharathorn, Whitmore Lake, MI (US); Kyle Oswald, Ann Arbor, MI (US); Anthony Powell, Ypsilanti, MI (US); Joel Harrison, Langley (CA)

(73) Assignee: ARBOR NETWORKS, INC., Westford, MA (US)

( * ) Notice: Subject to any disclaimer, the term of this patent is extended or adjusted under 35 U.S.C. 154(b) by 0 days.

(21) Appl. No.: 17/970,364

(22) Filed: Oct. 20, 2022

(65) Prior Publication Data

US 2024/0137302 A1 Apr. 25, 2024
US 2024/0235977 A9 Jul. 11, 2024

(51) Int. Cl.
*H04L 43/50* (2022.01)
*H04L 9/40* (2022.01)
*H04L 41/14* (2022.01)

(52) U.S. Cl.
CPC ............ *H04L 43/50* (2013.01); *H04L 41/145* (2013.01); *H04L 63/1416* (2013.01); *H04L 63/1441* (2013.01)

(58) Field of Classification Search
CPC ............ H04L 63/1425; H04L 63/0263; H04L 63/1416; H04L 63/1441; H04L 63/1466; H04L 67/75; H04L 45/38; H04L 12/1439; H04L 41/145; H04L 43/55; H04L 43/0888; H04L 43/50; H04L 43/04; H04L 43/0876; G06N 7/06

See application file for complete search history.

(56) References Cited

U.S. PATENT DOCUMENTS

| | | | | |
|---|---|---|---|---|
| 7,292,531 B1* | 11/2007 | Hill | ...................... | H04L 43/0882 370/230.1 |
| 7,886,046 B1* | 2/2011 | Zeitoun | .................. | H04L 41/145 706/56 |
| 8,374,102 B2* | 2/2013 | Luft | .................... | H04L 41/5067 709/224 |

(Continued)

OTHER PUBLICATIONS

Hansaka Angel Dias Edirisinghe Kodituwakku 1,* , Alex Keller 2 and Jens Gregor, "InSight2: A Modular Visual Analysis Platform for Network Situational Awareness in Large-Scale Networks", www.mdpi.com/journal/electronics, Electronics 2020, 9, 1747; doi: 10.3390/electronics9101747, pp. 1-15 (Year: 2020).*

*Primary Examiner* — Rachel J Hackenberg
(74) *Attorney, Agent, or Firm* — Foley & Lardner LLP

(57) ABSTRACT

A computer implemented method and system for simulating the effect of one or more flow specification rules upon archived network flow data. Archived network flow data is retrieved from a database that was exported from a network device. One or more flow specification rules are applied to the archived network flow data, wherein the one or more flow specification rules are configured to perform one or more flow specification actions on the archived network flow data. Determined are one or more flow actions affected on the archived network flow data by the applied one or more flow specification rules. Indication/notification of the determined one or more flow actions are provided.

19 Claims, 6 Drawing Sheets

| dst_port | src_port | protocol | | | | | | | | |
|---|---|---|---|---|---|---|---|---|---|---|
| Top Passed dst_port | | Top Dropped dst_port | | Top Rate Limited dst_port | | | Top Accepted dst_port | | | |
| dst_port | Passed Traffic | dst_port | Dropped Traffic | dst_port | Passed Traffic | Rate-Limited Traffic | dst_port | Accepted Traffic | | |
| 80 | 56.96 Mbps | 80 | 9.886 Mbps | 80 | 697.7 Kbps | 9.663 Mbps | 80 | 864.5 Kbps | | |
| 6346 | 19.07 Mbps | 4662 | 4.090 Mbps | 6346 | 280.8 Kbps | 3.842 Mbps | 1214 | 384.6 Kbps | | |
| 4662 | 18.96 Mbps | 6346 | 4.002 Mbps | 1214 | 270.6 Kbps | 3.767 Mbps | 4662 | 350.2 Kbps | | |
| 6699 | 18.94 Mbps | 6699 | 3.974 Mbps | 4662 | 270.4 Kbps | 3.745 Mbps | 6699 | 343.8 Kbps | | |
| 1214 | 18.56 Mbps | 1214 | 3.850 Mbps | 6699 | 261.3 Kbps | 3.631 Mbps | 6346 | 336.6 Kbps | | |
| 53 | 9.507 Mbps | 768 | 3.111 Mbps | 135 | 146.6 Kbps | 2.010 Mbps | 20 | 212.2 Kbps | | |
| 135 | 9.472 Mbps | 771 | 2.545 Mbps | 110 | 142.4 Kbps | 1.975 Mbps | 53 | 199.3 Kbps | | |
| 6112 | 9.465 Mbps | 21 | 2.102 Mbps | 6970 | 141.1 Kbps | 1.954 Mbps | 27015 | 198.5 Kbps | | |
| 194 | 9.434 Mbps | 20 | 2.039 Mbps | 23 | 139.5 Kbps | 1.937 Mbps | 25 | 191.6 Kbps | | |
| 5999 | 9.422 Mbps | 135 | 1.989 Mbps | 6112 | 138.4 Kbps | 1.937 Mbps | 22 | 188.1 Kbps | | |

(56) References Cited

U.S. PATENT DOCUMENTS

| | | | | |
|---|---|---|---|---|
| 8,934,495 | B1* | 1/2015 | Hilton | H04L 67/02 370/419 |
| 2007/0289017 | A1* | 12/2007 | Copeland, III | H04L 63/1416 709/224 |
| 2014/0258289 | A1* | 9/2014 | Bhetanabhotla | H04L 43/045 707/736 |
| 2015/0128274 | A1* | 5/2015 | Giokas | H04L 51/212 726/23 |
| 2015/0341212 | A1* | 11/2015 | Hsiao | H04L 67/75 715/735 |
| 2018/0131579 | A1* | 5/2018 | Jacobs | H04L 41/022 |
| 2018/0176237 | A1* | 6/2018 | Freedman | G06F 16/24568 |
| 2018/0357422 | A1* | 12/2018 | Telang | G06F 21/577 |
| 2020/0382540 | A1* | 12/2020 | Iekel-Johnson | H04L 63/0236 |
| 2021/0160184 | A1* | 5/2021 | Katan | G06F 12/0811 |
| 2022/0377093 | A1* | 11/2022 | Crabtree | H04L 43/045 |
| 2023/0045472 | A1* | 2/2023 | Bansal | H04L 41/145 |

* cited by examiner

| Mode |
| [Single] Comparison |
| Time Period |
| Last 5 minutes ∨ |
| [Run Simulation] |
| Filter | Time Period | Effect |
| Src:0.0.0.0/0, Dst:0.0.0.0/0, Protocols:1 | 22-08-29T15:22:50 → 2022-08-29T15:27:50 | Dropped 983.9 MBps, Passed 18.33 GBps |
| [×Cancel] [✓Save] |

| Rule | Passed | Accepted | Rate Limited | Dropped | Rate Graph |
|---|---|---|---|---|---|
| Drop ICMP | 418.3 Mbps | 0.000 bps | 0.000 bps | 21.53 Mbps | |
| Drop some TCP | 374.9 Mbps | 0.000 bps | 0.000 bps | 64.85 Mbps | |
| Rate Limit some TCP | 318.3 Mbps | 0.000 bps | 56.63 bps | 64.85 Mbps | |
| Rate Limit some TCP | 318.1 Mbps | 0.000 bps | 56.63 bps | 64.85 Mbps | |
| Accept some TCP | 312.9 Mbps | 5.195 Mbps | 56.63 bps | 64.85 Mbps | |
| Drop Some UDP | 297.3 Mbps | 5.195 Mbps | 56.63 bps | 80.44 Mbps | |
| Summary | 297.3 Mbps | 5.195 Mbps | 56.85 Mbps | 80.44 Mbps | |

FIG. 3B-2

| dst_port | src_port | protocol |
| --- | --- | --- |

| Top Passed dst_port | | Top Dropped dst_port | | Top Rate Limited dst_port | | | Top Accepted dst_port | |
| --- | --- | --- | --- | --- | --- | --- | --- | --- |
| dst_port | Passed Traffic | dst_port | Dropped Traffic | dst_port | Passed Traffic | Rate-Limited Traffic | dst_port | Accepted Traffic |
| 80 | 56.96 Mbps | 80 | 9.886 Mbps | 80 | 697.7 Kbps | 9.663 Mbps | 80 | 864.5 Kbps |
| 6346 | 19.07 Mbps | 4662 | 4.090 Mbps | 6346 | 280.8 Kbps | 3.842 Mbps | 1214 | 384.6 Kbps |
| 4662 | 18.96 Mbps | 6346 | 4.002 Mbps | 1214 | 270.6 Kbps | 3.767 Mbps | 4662 | 350.2 Kbps |
| 6699 | 18.94 Mbps | 6699 | 3.974 Mbps | 4662 | 270.4 Kbps | 3.745 Mbps | 6699 | 343.8 Kbps |
| 1214 | 18.56 Mbps | 1214 | 3.850 Mbps | 6699 | 261.3 Kbps | 3.631 Mbps | 6346 | 336.6 Kbps |
| 53 | 9.507 Mbps | 768 | 3.111 Mbps | 135 | 146.6 Kbps | 2.010 Mbps | 20 | 212.2 Kbps |
| 135 | 9.472 Mbps | 771 | 2.545 Mbps | 110 | 142.4 Kbps | 1.975 Mbps | 53 | 199.3 Kbps |
| 6112 | 9.465 Mbps | 21 | 2.102 Mbps | 6970 | 141.1 Kbps | 1.954 Mbps | 27015 | 198.5 Kbps |
| 194 | 9.434 Mbps | 20 | 2.039 Mbps | 23 | 139.5 Kbps | 1.937 Mbps | 25 | 191.6 Kbps |
| 5999 | 9.422 Mbps | 135 | 1.989 Mbps | 6112 | 138.4 Kbps | 1.937 Mbps | 22 | 188.1 Kbps |

FIG. 3B-3

SYSTEM AND METHOD FOR DETERMINING FLOW SPECIFICATION EFFICACY

BACKGROUND

1. Field

The disclosed embodiments relate to the field of communications technologies, and in particular, to a flow specification (Flowspec) message processing method and system, and an apparatus.

2. Description of Related Art

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. For instance, networks and network devices are increasingly affected by the damages caused by Denial of Service ("DoS") attacks (which includes a Distributed Denial of Service (DDoS) type of DoS attacks. A DoS attack is defined as an action taken upon on a computer network or system by an offensive external device that prevents any part of the network from functioning in accordance with its intended purpose. This attack may cause a loss of service to the users of the network and its network devices.

To mitigate the malicious effects of DoS/DDoS attacks, particular use of Border Gateway Protocols have been utilized. The Border Gateway Protocol (BGP) is a dynamic routing protocol used between autonomous systems. The Border Gateway Protocol is widely applied to the Internet to transfer routing information between AS's and edge routers within an AS. The transferred routing information includes network layer reachability information (NLRI), such as Internet Protocol (IP) routing information, Media Access Control (MAC) routing information, a Flowspec rule. The BGP Flowspec rule is one of centralized traffic scheduling technologies based on a software-defined networking (SDN) architecture. A centralized SDN controller delivers a Flowspec rule to a forwarding device by using a BGP Flowspec message, to optimize and schedule a service flow.

Flowspec messages/rules are particularly implemented in networks to mitigate network attacks, such as DoS/DDoS attacks. It is to be understood a particular function of a Flow Specification Rule is as a mechanism implemented by network certain network devices (e.g., network routers) for causing the dropping, throttling, marking, or passing of certain network traffic through that network device (e.g., a router) typically based on a number of characteristics of that network traffic such as its port, protocol number, or destination address. It is to be appreciated that many Flowspec rules can be deployed to one or more routers in a network, wherein each rule is applied in a particular order which is standardized with some variation between network device vendors.

In accordance with the illustrated embodiments, it to be understood and appreciated that Flowspec rules, while described above with reference to performing DoS mitigation actions, are not only for mitigating network attacks. For instance, the current rfc defined FlowSpec actions are traffic-rate, traffic-action, redirect, and traffic-marking.

Thus, an important aspect of using Flowspec rules is to control (and mark) traffic flow in a network (e.g., to mitigate a network DoS attack), while not being overly deleterious to normal network operations (good traffic will still arrive as intended).

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

Generally, the illustrated embodiments relate to a system, apparatus and method that uses archived/stored network flow data to simulate the effect that one or more flow specification rules would have on previously recorded network traffic. Captured is preferably NetFlow data, which is a type of data exported by network devices, such as routers, that describes the traffic that the network device (e.g., router) is handling. By simulating one or more flow specification rules on archived network flow traffic (e.g., via captured netflow data), this provides the ability to estimate the efficacy of flow specification rules when applied (e.g., announced to) real-time network traffic.

In accordance with certain illustrated embodiments, the timeframe of the recorded network flow traffic is configurable for enabling a user to simulate the effect of flow specification rules during a previous time period, such as when a network attack was occurring to enable a determination if those flow specification rules will be efficacious for a similar attack in the future. Additionally, a user may simulate the effect of flow specification rules on a time period when no attack was occurring to determine if the rules will negatively affect normal ("good") network traffic.

To achieve these and other advantages and in accordance with the purpose of the illustrated embodiments, in one aspect, described is a computer implemented method, apparatus and system for simulating the effect of one or more flow specification rules upon archived network flow data. One or more flow specification rules are applied to the archived network flow data, wherein the one or more flow specification rules are configured to perform one or more flow specification actions on the archived network flow data. Determined are one or more flow actions affected on the archived network flow data by the applied one or more flow specification rules. Indication/notification of the determined one or more flow actions are generated provided.

BRIEF DESCRIPTION OF THE DRAWINGS

So that those skilled in the art to which the subject disclosure appertains will readily understand how to make and use the devices and methods of the subject disclosure without undue experimentation, illustrated embodiments thereof will be described in detail herein below with reference to certain figures, wherein:

FIG. 3A illustrates application/effect of a single flow specification rule in accordance with the process of FIG. 2.

DETAILED DESCRIPTION OF CERTAIN EMBODIMENTS

Figure 1:
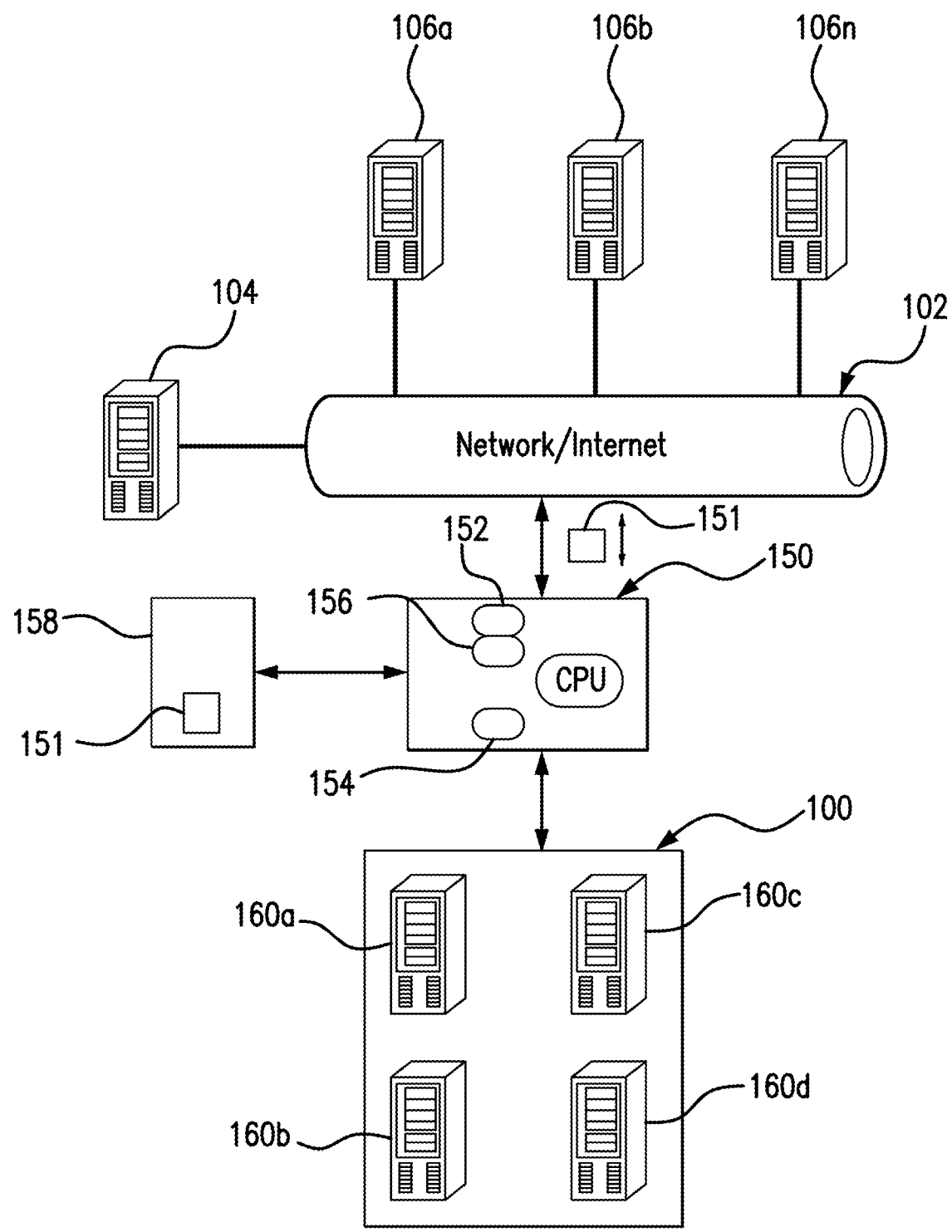
FIG. 1 is a schematic diagram showing network architecture and the relationship between a monitoring device and a protected network according to an illustrated embodiment.

Aspects of the disclosed embodiments are illustrated in the following description and related drawings directed to specific illustrated embodiments. Alternate embodiment's may be devised without departing from the scope of the illustrated embodiments. Additionally, well-known elements of the illustrated embodiments will not be described in detail or will be omitted so as not to obscure the relevant details of the illustrated embodiments.

The word "exemplary" is used herein to mean "serving as an example, instance, or illustration." Any embodiment described herein as "exemplary" is not necessarily to be construed as preferred or advantageous over other embodiments. Likewise, the term "illustrated embodiments" does not require that all illustrated embodiments include the discussed feature, advantage or mode of operation.

Unless defined otherwise, all technical and scientific terms used herein have the same meaning as commonly understood by one of ordinary skill in the art to which the illustrated embodiments belong. Although any methods and materials similar or equivalent to those described herein can also be used in the practice or testing of the illustrated embodiments, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. The terminology used herein is for the purpose of describing particular embodiments only and is not intended to be limiting of the illustrated embodiments. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the illustrated embodiment's may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the illustrated embodiments based on the below-described embodiments. Accordingly, the embodiments described herein are not to be limited by what has been particularly shown and described, except as indicated by the appended claims.

It is to be further understood the illustrated embodiments of the present illustrated embodiments describe a system, apparatus and process for simulating the effect/efficacy of a single flow specification rule, and simulating the effect/efficacy of a collection of rules (a Flow Specification Ruleset) on a computer system/device or network.

Turning now descriptively to the drawings, in which similar reference characters denote similar elements throughout the several views, FIG. 1 illustrates the relationship between a protected network 100, a network monitoring device 150, Internet 102, and external host devices 106a, 106b . . . 106n, 104.

In a typical implementation, the external network devices 106a, 106b . . . 106n, 104 (also referred to as external devices, routers or host devices) attempt to connect to protected devices 160 within the protected network 100 typically via a private network or a public computer network such as the Internet 102. Examples of external network devices include servers, routers, laptops, desktop computers, tablet devices, mobile phones, mobile computing devices, video games systems, televisions and other similar devices and systems having Internet connectivity. In accordance with the illustrated embodiments, and for ease of illustration and description purposes, the external devices 106a, 106b . . . 106n, 104 are to each be referred to as a network router, wherein such routers have the capability to forward traffic and to classify, shape, rate limit, filter, or redirect packets based on administratively defined policies (e.g., as prescribed by an announced specification rule). These traffic policy mechanisms allow network operators to define match rules that operate on multiple fields of the packet header. Actions, such as the ones described above, can be associated with each rule. However, the illustrated embodiments are not to be understood to be limited to such router devices as any suitable network device may be utilized.

In a preferred embodiment, network traffic from the communication network 102 to one or more monitored networks 100 is monitored by a network monitor device 150, such as the Sightline™ system commercially available from NetScout Systems, Inc. The network monitor device 150 is preferably located between the Internet 102 and one or more monitored networks 100. In other embodiments, the network monitor device 150 may be located within the Internet, service provider network or enterprise network rather than as a network edge as illustrated. In accordance with the illustrated embodiments, the network monitor 150 is preferably configured and operative to process network flow data, which data is utilized by network monitor device 150 to control the flow of network traffic to the one or more monitored networks 100. For instance, one purpose may be for detecting network attacks (e.g., DoS/DDoS), and to direct strategies for blocking such attacks using a variety of mitigation strategies, such as flow specification rules. The network monitor device 150 is preferably configured and operable to trigger manually configured flow specification mitigations consisting of a single flow specification rule or multiple rules (e.g., via flow specification rulesets).

The network monitor device 150 preferably includes a packet processing system preferably having an external high-speed network interface 152 and a protected high-speed network interface 154. Under current technology, these interfaces are capable of handling 1.0-100 Gbps, for example. The network monitor device 150 may further include processors 156 that preferably process the network packets 151 received at interfaces 152 and 154. Additionally, a central processing unit (CPU), random access memory (RAM), and a storage device 158 are preferably used to further support the processing of the received packets and are described in detail below in conjunction with FIG. 2.

For instance, the storage medium may be the Arbor Insight™ system commercially available from NetScout Systems, Inc. The storage device 158 preferably stores network flow data that is received by the network monitor device 150 from external host devices/routers 106a, 106b . . . 106n, 104 to a protected network 100, as described in more detail below. It is to be appreciated that the network flow data may be exported from the network devices/routers (106a, 106b . . . 106n, 104) in multiple formats, such as for example: NetFlow, IPFIX, and sFlow.

Additionally, the storage device 158 also preferably includes a plurality of flow specification rules and Flow Specification Rulesets. A flow specification rule is typically an n-tuple consisting of several matching criteria that can be applied to IP traffic. A given IP packet is said to match the defined flow specification rule if it matches all the specified criteria, wherein such an n-tuple is typically encoded into a BGP NLRI. It is to be appreciated that a given flow specification rule may be associated with a set of attributes, depending on the particular application; such attributes may or may not include reachability information (i.e., NEXT_HOP), wherein well-known or AS-specific community attributes can be used to encode a set of predetermined actions. And with regards to a Flow Specification Ruleset, it is to be understood to consist of a collection of flow specification rules that are stored in the storage device 158 that can be deployed as a group to alter traffic, usually in order to mitigate a denial of service attack. For instance, this collection may consist of up to 49 individual flow specification rules.

In a typical implementation, the network monitor device 150 authenticates external host devices 106a, 106b . . . 106n, 104 before allowing the external devices to access protected devices 160 within a monitored network 100.

According to the exemplary configuration illustrated in FIG. 1, the network monitor device 150 may comprise a Client Edge (CE) device. The CE device can provide entry points into the monitored network 100. In alternative configuration, the network monitor device 150 may comprise a virtual device. In other words, at least some of the embodiments do not require the network monitor device 150 to be a physical hardware device or to be located in a particular part of the network infrastructure, as long as the network monitor device 150 can be in the path of the incoming traffic to the monitored network 100. It is to be appreciated that for ease of illustration, the network monitor device 150 in the illustrated embodiment is shown coupled to a single monitored network 100. However, it is to be understood the illustrated embodiments are not to be limited to such a single monitored network 100 as the network monitor device 150 in accordance with the illustrated embodiments is to be understood to be coupled to a plurality of different monitored networks.

Figure 2:
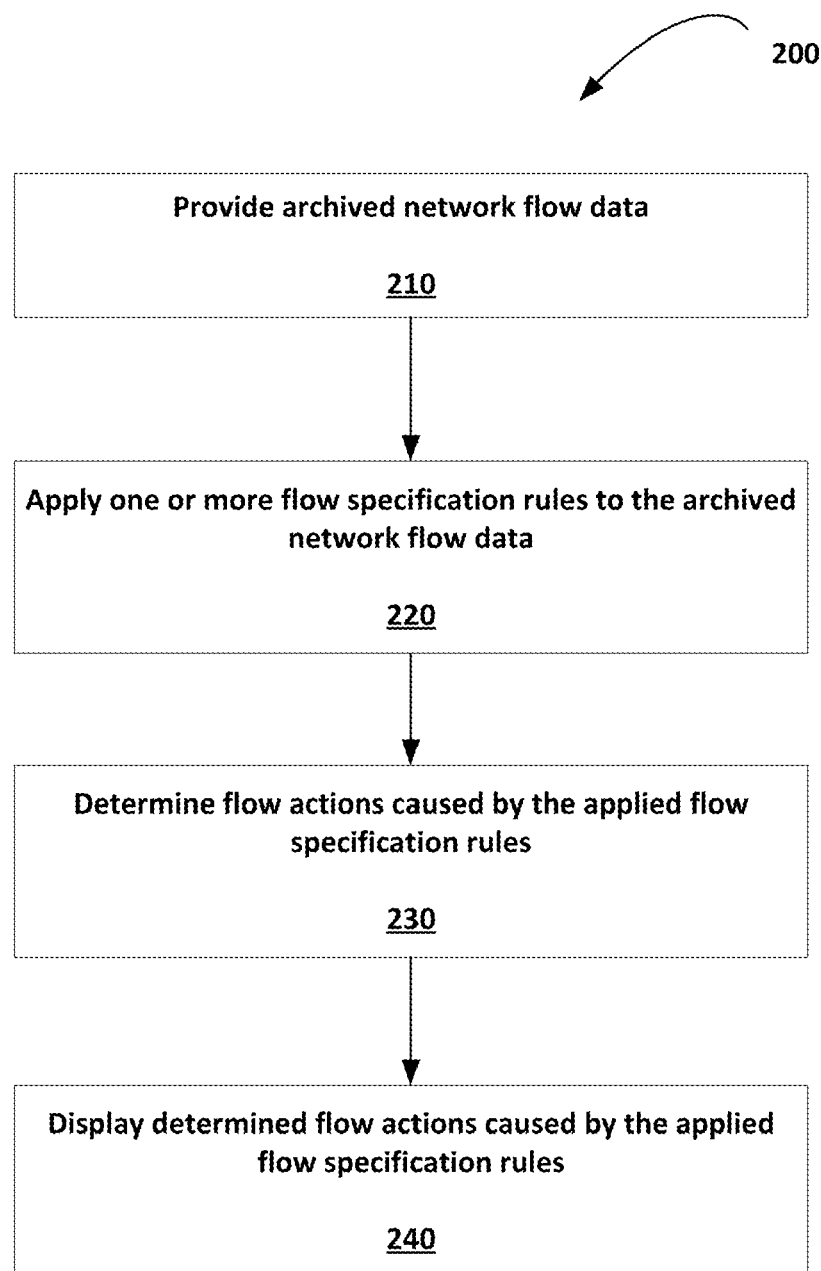
FIG. 2 is a flowchart illustrating a process for simulating the effect and efficacy of one or more flow specification rules applied upon archived network flow data in accordance with the illustrated embodiments.

Turning to FIG. 2, illustrated is an exemplary and non-limiting flowchart depicting a method for simulating the effect/efficacy of one or more flow specification rules on network traffic flowing to a monitored network in accordance with certain illustrated embodiments. Before turning to description of FIG. 2, it is noted that the flow diagram in FIG. 2 illustrates exemplary operational steps carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

It is to be appreciated that the below described embodiments generally relate to a network monitor device 150 configured and operative to simulate the effect of a single flow specification rule, and/or simulate the effect of a collection of rules (e.g., a Flowspec ruleset). In both scenarios, the network monitor device 150 preferably provides a user interface configured and operative to enable a user to choose a time period for which to run an aforesaid simulation of a single flow specification rule and/or Flowspec ruleset against archived network flow data as well as view the affect of application of such applied flow specification rule(s).

In accordance with the illustrated embodiments, when a user initiates a simulation run, the user interface preferably queries the storage device 158, which then builds a query executed on the network monitor device 150. This query preferably retrieves stored network data during a specified time period and progressively applies one or more flow specification rules to retrieved network flow data traffic. For instance, if a flow specification rule (FlowSpec rule) matches, the amount of traffic that is dropped, limited, or accepted is determined and noted by the network monitor device 150, as well as the index of the matching rule. Typically, an n-tuple consisting of the matching criteria defines an aggregate traffic flow specification rule. The matching criteria can include elements such as source and destination address prefixes, IP protocol, and transport protocol port numbers. It is to be appreciated that each FlowSpec rule in a below described simulation is preferably assigned an index based on the ordering defined in rfc5575 section 5.1 (which typical network router venders are expected to implement). The results of the aforesaid query are then preferably returned to a user interface provided by the network monitor device 150, which then displays them for a user/network administrator (e.g., FIG. 3).

With reference now to FIG. 2 (and with continued reference to FIG. 1) described now is an exemplary process (referenced generally by 200), utilizing network monitoring device (e.g., 150) for simulating the effect/efficacy of a single FlowSpec rule, and/or simulating the effect/efficacy of a FlowSpec ruleset on network traffic flowing to one or more monitored computer networks 100.

It is to be appreciated that the network monitor device 150 preferable captures network traffic data exported (e.g., which may be in one of the flowing data formats: Netflow; IPIX; and sFlow) from one or more external hosts/routers 106a-106n, 104, which is then preferably stored as time indexed network flow data in the coupled storage device 158. It is to be appreciated that in accordance with the illustrative embodiments, a predetermined amount of network flow data is stored/archived in the storage device 158 sufficient to provide an accurate representation of network traffic flowing to the one or more monitored networks 100.

Figures 1, 3B:
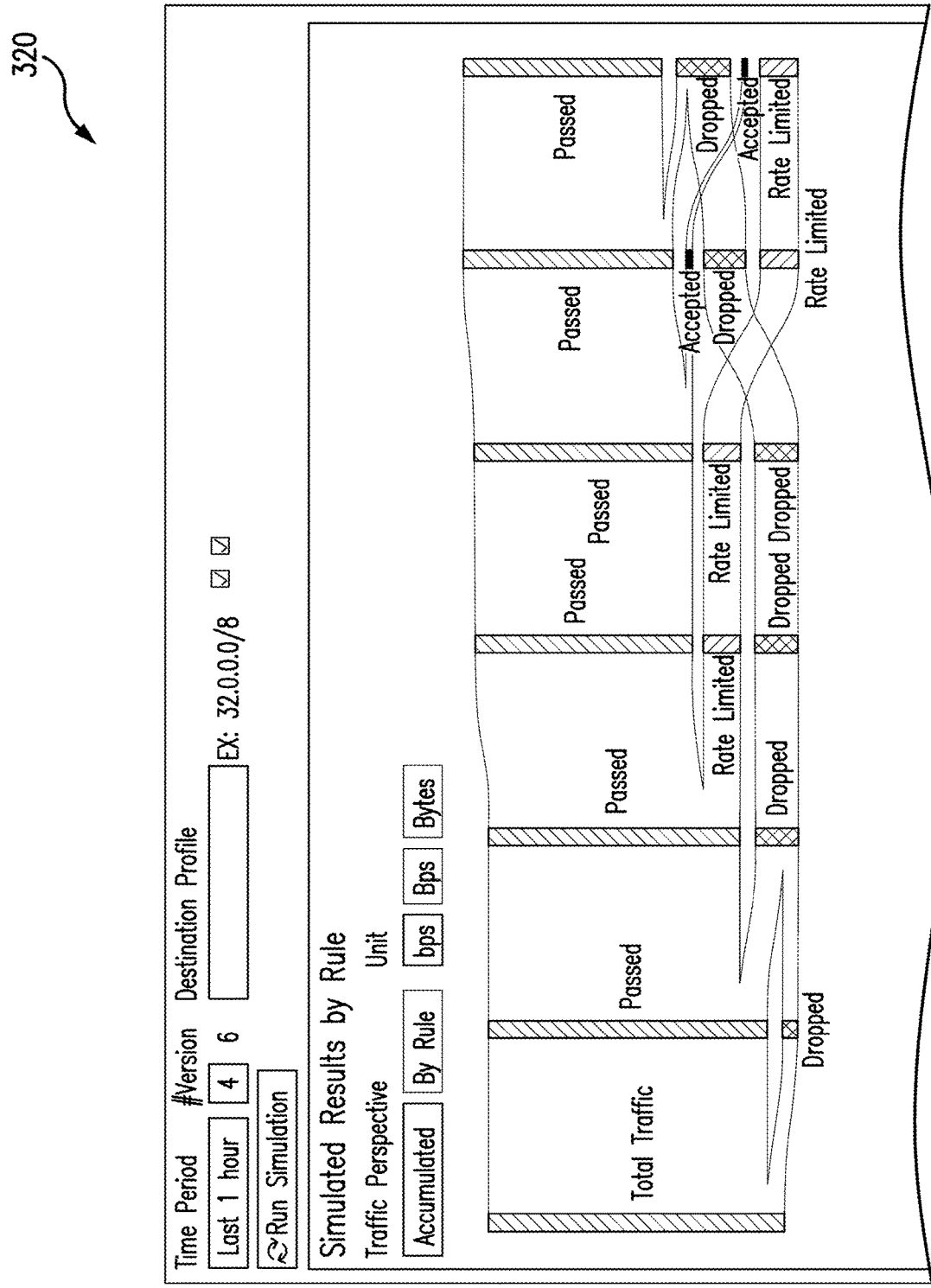
FIG. 3B illustrates application/effect of a flow specification ruleset (which is spread over three sheets (3B-1, 3B-2 and 3B-3)) in accordance with the process of FIG. 2.

Starting at step 210, preferably upon user selection, archived network flow data is retrieved from storage device 158 that was exported from a network device (106a, 106b . . . 106n, 104) coupled to a network 100. Preferably, the aforesaid retrieved network flow data is retrieved in accordance with a user configured time frame for the archived network flow data. Next, at step 220, preferably upon user selection, one or more flow specification rules (and or rulesets) are selected by a user/network administrator to be applied to the archived network flow data, wherein the one or more flow specification rules (and/or rulesets) are configured to perform one or more flow specification actions on the archived network flow data. As mentioned above, the storage device 158 coupled to the network monitor device 150 preferably stores a plurality preconfigured flow specification rules (and/or rulesets) which may be selected by a user and/or the user may configure one or more flow specification rules to be applied to the retrieved archived network flow data. For instance, in accordance with the illustrative exemplary screenshots, FIG. 3A illustrates application/effect of a single flow specification rule, while FIG. 3B (divided in FIGS. 3B-1. 3B-2 and 3B-3) illustrates application/effect of a flow specification ruleset. Preferably, the one or more flow specification rules are progressively applied to the retrieved captured network flow data. As mentioned above, the one or more flow specification actions to be performed by the applied one or more flow specification rules upon the retrieved archived network flow data may include (but are not limited to): traffic-rating, traffic-redirecting, traffic-marking, traffic-accepting, traffic-dropping, traffic rate-limiting.

Upon applying the one or more flow specification rules to the retrieved archived network flow data, at step 230 determined by the network monitoring system 150 are one or more flow actions affected on the archived network flow data by the applied one or more flow specification rules in the event the one or more flow specification rules matches with the retrieved network flow data they are applied to. Additional to any flow actions determined to have been caused by the applied flow specification rules, the network monitor device may also identify an index for each of the one or more applied flow specification rules. Then at step 240, the network monitor device 150 preferably generates/provides a display indicating the determined one or more flow actions caused by the aforesaid applied flow specification rules, as well as the identified indexes For instance, FIG. 3A depicts a screenshot 310 displaying the effects of an applied flows specification rule, and FIG. 3B depicts a screenshot 320 displaying the effects of an applied flow specification ruleset.

In accordance with certain illustrated embodiments, the network monitor device 150 may be further configured and operative to detect a network attack in retrieved archived network flow data and/or network data flowing to the one or more monitored networks. Additionally, the network monitor device 150 may be further configured and operative to announce one or more flow specification rules to a device (e.g., a router) coupled to a monitored network, which may be responsive to determining one or more flow actions affected on the archived network flow data by the applied one or more flow specification rules (step 230).

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of the present disclosure, and not in limitation thereof.

In summary, various embodiments of the present illustrated embodiments disclose a novel approach for simulating the effect/efficacy of a single flow specification rule, and/or simulate the effect of a collection of rules (e.g., a Flowspec ruleset) on network flow data without adversely affecting the operability of a monitored network. Exemplary advantages of the illustrated embodiments include (but are not limited to) mitigating unintended consequences of applied/triggered flow specification rules by allowing a network administrator/user to preview the effects of those rules before announcing/deploying them. It also provides tighter iteration cycle for building a flow specification rule to counter an ongoing attack (e.g., a network administrator/user does not need to wait for the rule to be deployed/announced to routers to see the effects). Further, it provides a network tool enabling a network administrator/user to build a flow specification rules and/or flow specification rulesets to use during future mitigations of a previously seen network attack.

It is to be understood the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present illustrated embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various illustrated embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
receiving, via a user interface, a first query of a storage device coupled to an external network;
retrieving, by a network monitoring device disposed between the external network and a protected network, stored external network data, exported from the external network and aimed at the protected network, from the storage device;
applying, by the network monitoring device, one or more flow specification rules to the retrieved stored external network data, wherein the one or more flow specification rules are configured to perform one or more flow specification actions on the retrieved stored external network data, wherein each of the one or more flow specification actions corresponds to performing, on the stored external network data, dropping, rate-limiting, traffic accepting, or passing of network traffic;
finding, by the network monitoring device, a match of one of the one or more flow specification rules using a matching criteria;
determining, by the network monitoring device, network traffic activity corresponding to the matched one of the one or more flow specification rules;
identifying, by the network monitoring device, data from the determined network traffic activity that is respectively dropped, limited, passed, or accepted based on the flow specification actions corresponding to the matched one or more flow specification rules; and
generating, by the network monitoring device based on the identified data, a user interface comprising a plurality of lists of ports of external network devices, each list corresponding to a different flow specification action and comprising a plurality of ports of external network devices ordered based on an amount of network traffic impacted by the flow specification action of the list.

2. The computer implemented method of claim 1, wherein the matching criteria includes source and destination information.

3. The computer implemented method of claim 2, wherein the source and destination information includes address prefixes, IP protocol, and transport protocol port numbers.

4. The computer implemented method of claim 1, wherein the retrieved stored external network data is in at least one of the following formats: Netflow; IPIX; and sFlow.

5. The computer implemented method of claim 1, further comprising building, based on the received first query, a request for stored external network data during a specified time period.

6. The computer implemented method of claim 1, wherein the one or more flow specification rules are progressively applied to the retrieved stored external network data.

7. The computer implemented method of claim 1, wherein responsive to the one or more flow specification rules matching the retrieved stored external network data, one or more flow actions on the retrieved stored external network data are determined.

8. The computer implemented method of claim 7, wherein further responsive to the one or more flow specification rules matching the retrieved stored external network data, an index for each of the one or more specification rules is identified.

9. The computer implemented method of claim 8, wherein the determined one or more flow actions and the one or more identified indexes associated with the one or more flow specification rules matching the retrieved stored external network data are displayed to a user.

10. The computer implemented method of claim 1, further including displaying the one or more flow specification rules.

11. The computer implemented method as recited in claim 1, wherein the one or more flow specification rules are configured to affect a change to the external network data flowing through at least one network device.

12. The computer implemented method of claim 1, further including detecting a network attack in the network traffic activity.

13. The computer implemented method of claim 1, wherein the applied one or more flow specification rules are selected from a database of preconfigured specification rules.

14. A network monitoring device, comprising:
one or more databases storing external network data exported from a plurality of external network devices coupled to an external network aimed at a protected network;
a processor disposed between the external network and the protected network in communication with memory configured to store instructions, wherein the processor upon execution of the instructions is configured to:
receive, via a first user interface, a first query of the one or more databases storing the external network data;
retrieve the stored external network data from the one or more databases in response to receipt of the first query;
apply one or more flow specification rules to the retrieved stored external network data, wherein the one or more flow specification rules are configured to perform one or more flow specification actions on the retrieved stored external network data, wherein each of the one or more flow specification actions corresponds to performing, on the stored external network data, dropping, rate-limiting, traffic accepting, or passing of network traffic;
find a match of one of the one or more flow specification rules using a matching criteria;
determine network traffic activity corresponding to the matched one of the one or more flow specification rules;
identify data from the determined network traffic activity that is respectively dropped, limited, passed or accepted based on the flow specification actions corresponding to the matched one or more flow specification rules; and generating, by the network monitoring device based on the identified data, a user interface comprising a plurality of lists of ports of external network devices, each list corresponding to a different flow specification action and comprising a plurality of ports of external network devices ordered based on an amount of network traffic impacted by the flow specification action of the list.

15. The network device of claim 14, wherein the processor is further configured to:

monitor the external network data flowing through one or more networks; and detect a network attack in the network data to the one or more networks.

16. The network device of claim 14, wherein the one or more flow specification rules are selected from a plurality of preconfigured specification rules stored in the one or more databases.

17. The network device of claim 14, wherein the one or more announced flow specification rules are configured and operative to mitigate a network attack.

18. The network device of claim 14, wherein retrieving the network data further includes retrieving captured external network data corresponding to a user defined time period.

19. The network device of claim 14, wherein the one or more flow specification rules are progressively applied to the retrieved captured external network data.

* * * * *